United States Patent [19]

Muller

[11] Patent Number: 4,464,087
[45] Date of Patent: Aug. 7, 1984

[54] CUTTING TOOL

[75] Inventor: Jean-Marc Muller, Sévery, Switzerland

[73] Assignee: Stellram S.A., Nyon, Switzerland

[21] Appl. No.: 377,256

[22] Filed: May 11, 1982

[30] Foreign Application Priority Data

Feb. 12, 1982 [CH] Switzerland .................. 876/82

[51] Int. Cl.$^3$ ............................................. B26D 1/00
[52] U.S. Cl. ..................................... 407/113; 82/1 C
[58] Field of Search ................. 82/1 C; 407/113, 114, 407/116

[56] References Cited

U.S. PATENT DOCUMENTS 2,808,637 10/1957 Hudson ................................. 407/113
3,955,259 5/1976 Gustafsson ........................... 407/113
4,297,058 10/1981 Armbrust et al. .................. 407/113

FOREIGN PATENT DOCUMENTS 657863 2/1960 Canada ................................. 407/114
2162682 7/1973 Fed. Rep. of Germany .
2406491 5/1979 France .
501464 2/1971 Switzerland .
204953 10/1923 United Kingdom .
178641 3/1966 U.S.S.R. .
749571 7/1980 U.S.S.R. ............................... 82/1 C Primary Examiner—W. D. Bray
Attorney, Agent, or Firm—Young & Thompson

[57] ABSTRACT

A cutter bit (1) with a cutting edge adapted to come into contact with the piece to be machined and a chip-cutter bit (2) superposed with an edge located at least along a portion of its length behind the first cutting edge. The two edges define between themselves a slot (9) giving access to a channel (10) provided in the tool, this channel extending along the length of this slot and being open at at least one of its ends. The tool is particularly useful for machining composite materials comprising fibers embedded in a resin.

11 Claims, 7 Drawing Figures

CUTTING TOOL

The present invention relates to a cutting tool adapted to be secured to a tool holder, particularly for the machining of composite materials containing fibers.

For a number of years composite materials have existed, generally in the form of plates, tubes, etc., comprising essentially a fibrous constituent embedded in or covered with a suitable resin. Such materials are very useful, particularly when they are provided with woven synthetic resistant fibers of the type "Kevlar" (a product of Dupont de Nemours), particularly for aeronautic, aerospace, naval or automotive constructions and use in other industrial fields. These materials have the great advantage of being very strong with very light weight.

Unfortunately, there do not now exist tools permitting satisfactory machining of such composite materials. Thus, because of the fact that the woven resistant fibers encased in resin or fragments of fibers embedded in random fashion in the resin present themselves to the cutting edge of a tool of known type with random orientation, the utilization of such a tool results in imprecise machining and leaves a surface bristling with incompletely cut fibrous elements which are even drawn out into the unmachined region.

As a result, the aim of this invention consists in providing a cutting tool which may be used to machine in a satisfactory manner a composite material containing fibers, and imparting moreover to the machined surface a smooth appearance and free from uncut fibrous elements. The cutting tool according to the invention, for achieving the recited aim, is characterized by the fact that it has at least one first cutting edge adapted to come into contact with the piece to be machined and at least one second edge disposed along at least a portion of its length behind the first cutting edge, and by the fact that the two edges define between themselves a slot giving access to a channel provided in the tool, this channel extending along the length of this slot and being open at at least one of its ends.

This cutting tool may have the form of a single piece adapted to be fixed removably or not on a tool carrier, or may have the form of two separate bits adapted to be superposed and removably mounted on a tool carrier. It may also be formed for example of sintered hard metal, of ceramic or in any other alloy or appropriate material.

According to a preferred embodiment, the cutting tool according to the invention can comprise a first cutting edge having the form of a broken line, a portion of this edge serving thus as a flat surface permitting imparting a desirable surface condition to the machined piece.

The accompanying drawing shows schematically and by way of example one embodiment of cutting tool according to the invention.

Figure 3A:
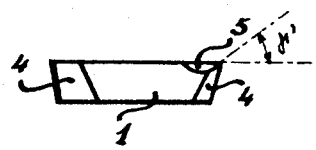
FIGS. 3A and 3B are views respectively in plan and elevation of an embodiment of the bit having cutting edges.
Figure 4A:
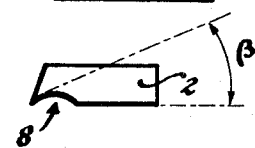
FIGS. 4A and 4B are views respectively in plan and elevation of an embodiment of the bit comprising said second edge.
Figure 3B:
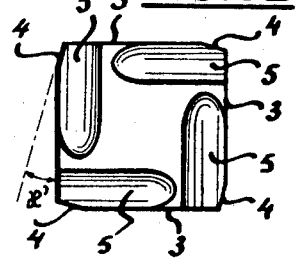
Figure 4B:
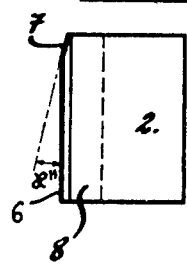

The embodiment of cutting tool according to the invention, as illustrated with reference to FIGS. 1-4, comprises two superposed bits, namely a cutter bit 1 (FIGS. 3A and 3B) and a bit 2 having said second edge and which will be hereinafter referred to as the "chip-cutter bit" (FIGS. 4A and 4B).

The cutter bit 1, shown here as being square, has four cutting edges 3, each in the form of a broken line and whose bevelled portion 4 comprises a flat whose use will be described later. The angle $\alpha'$ between flat 4 and cutting edge 3 properly speaking is here about 15°. In non-illustrated modifications, the shape of the cutter bit may be different, particularly as to the number of cutting edges. The angle $\alpha'$ defined above may be comprised between 5° and about 60°, but it is preferably between 15° and 20°. The cutter bit 1 comprises also chip-breaking throats 5 substantially parallel to the cutting edges 3 and extending from about a third of the length of each edge 3 to the bevelled end 4. According to non-illustrated modifications, the chip-breaking throats may extend the length of all or a portion of the cutting edge and along an axis forming with the cutting edge an angle of ±10°.

Figure 2:
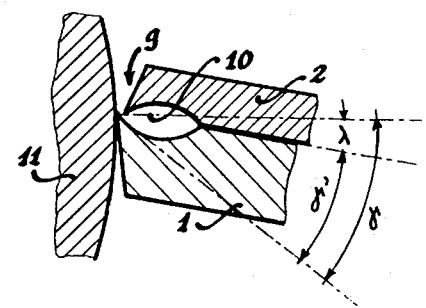
FIG. 2 is a cross section on the line A—A of FIG. 1.

The cutting angle $\gamma'$ of cutting edge 3 of bit 1 is here about 30° (FIGS. 2 and 3A). Generally speaking, this cutting angle $\gamma'$ may be comprised between 10° and 50°, preferably between 15° and 35°.

The chip-cutter bit 2 has in the illustrated embodiment a single edge 6 whose end is bevelled to form a flat 7, the angle $\alpha''$ having the same value as the angle $\alpha'$ of the cutter bit 1. Edge 6 is also bounded by a throat 8 substantially parallel to the edge and open at its two ends. The angle $\beta$ of the slope of the throat 8 from the edge 6 is here about 30° (FIG. 4A), but it may be in non-illustrated variations between 10° and 50°, preferably between 15° and 35°. As in the case of the cutter bit 1, the throat may extend along an axis forming with the edge an angle of ±10°. Finally, according to non-illustrated modifications, the chip-cutter bit may comprise a throat along each edge for all or a part of the length thereof.

Figure 1:
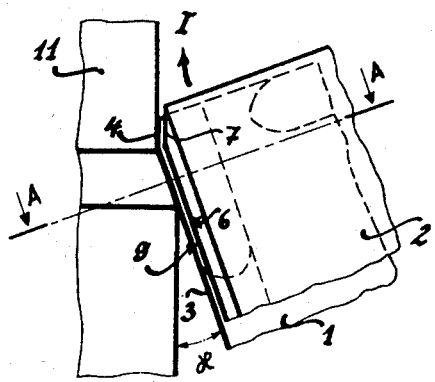
FIG. 1 is a partial plan view of the tool in contact with a cylindrical workpiece to be machined.

As shown in FIGS. 1 and 2, the cutting tool is comprised by the superposition of the two bits 1 and 2 which have just been described with reference to FIGS. 3A, 3B, 4A and 4B. This superposition is effected such that the edge 6 of the chip-cutter bit 2 will be substantially parallel to the cutting edge 3 of the cutter bit 1 and slightly behind the latter so as to define a slot 9 between them. This slot 9 gives access to a channel 10 whose walls are formed by the respective throats 5 and 8 of the two superposed bits 1, 2 and which has a transverse cross section of generally C-shape. In the illustrated example (see FIG. 2), the edge 6 of the chip-cutter bit 2 is located very slightly above the cutting edge 3 of cutter bit 1. Moreover, the bevelled portion 7 of the chip-cutter bit 2 is disposed likewise above the bevelled portion 4 of the cutting edge 3 of the cutter bit 1. In non-illustrated modifications, the edge of the chip-cutter bit may be located at the same level as the cutting edge, or even below the latter.

The two superposed bits 1, 2 may be secured to a tool carrier (not shown) removably or not. In the first case, one can use known systems such as a clamp, a central screw, etc. The use of a clamp system is advantageous, because it makes possible adjustment of the relative position of the two bits 1, 2, and more particularly of the width of the slot 9 between the cutting edge 3 and the chip-cutting edge 6.

The cutting tool which has just been described is useful more particularly for machining composite materials, such as those constituted by synthetic fibers, of the type "Kevlar", woven and embedded in a resin. As shown in FIG. 1, the cutting edge 3 should be disposed at an angle α (corresponding to the angles α', α" defined above) with respect to the surface of the workpiece to be machined, which is here a cylindrical tube 11, such that the bevelled portion 4 forming a flat will be applied against the machined surface at a zero angle.

Tests that have been carried out have shown that to obtain satisfactory machining, the width of the slot 9 between the cutting edge 3 and the chip-cutting edge 6 should be selected as a function of the cutting depth and the stroke which are selected, in such a way that the chips will be evacuated from the channel 10 through its open end, in the direction of the arrow I, and not through said slot. Moreover, it has also been shown experimentally that to obtain good machining, the cutting angle γ in the operative position, corresponding to the sum of the cutting angle γ' of the cutter bit and the angle of inclination λ of the tool with respect to a direction perpendicular to the surface to be machined (see FIG. 2), should be at least 20°, preferably at least 25°. Observation of the chips produced has shown moreover that the latter have the form of a composite of chips of resin and fragments of fiber. These various experimental observations above have lead to the formation of the following hypothesis as to the mechanism which permits obtaining machining which is substantially better than that with known cutting tools. The cutting edge 3 of the cutter bit 1 acts on the material to be machined in the same manner as a conventional tool on homogeneous material. From the beginning of the machining operation, the channel 10 fills with chips entering by the slot 9. The fibers or fragments of fibers are thus imprisoned in the channel and cannot spring back out of the latter. These chips have a movement which is approximately circular within the channel 10, in a counterclockwise direction, which tends to move them back toward the slot 9. There is thus a jamming movement between the chips containing fibers or fragments of fibers which enter by slot 9 and those which seek to leave by the latter but are prevented, and the chips are thus subjected to a "chopping" action by the chip-cutting edge 6, which is highly effective on the fibers or fragments of fibers. The chips thus cut are then evacuated through channel 10 in the direction of arrow I (FIG. 1). It has been shown experimentally that, in order for the fiber-chopping effect to be satisfactory and the edge 6 to act as a "chip-cutter" edge, the latter should be sharpened and wear-resistant.

Moreover, the bevel portion 4 comprising a planing flat will come into contact during machining against the machined surface, and the latter will thus have a smooth surface appearance freed from uncut fiber fragments.

Figure 5:
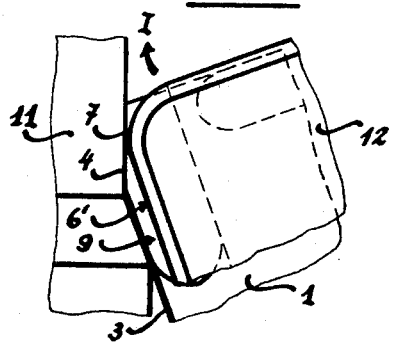
FIG. 5 is a partial plan view of a modification of the cutting tool shown in FIG. 1.

According to a simplified modification shown in FIG. 5, the chip-cutter edge 6' may be constituted by the cutting edge of a conventional cutter bit 12 with rounded corners and secured to the backside of the cutter bit 1.

The cutting tool may also have a straight cutting edge but with no bevelled portion; however, to obtain a very good surface condition, the presence of such a flat is highly desirable or even necessary.

Of course, other forms of cutter bits are possible, for example with a number of sides equal to three or greater than four. The cutting tool may also be formed of a single piece. In this case, the width of the slot between the cutting edge and the chip-cutter edge is not adjustable, and it is necessary to provide several tools each having slots of different widths and being adapted to the machining of a predetermined material under conditions which are also predetermined.

It is evident that in other modifications, the edges 3 and 6 of the cutting tool need not necessarily be exactly parallel but can comprise, in plan view, or sideways, a small angle between themselves (at most about 5°). In such an embodiment, the width of the slot 9 will be variable and not constant.

By way of example of use, one can cite the case of machining the outside diameter of a tube of woven "Kevlar" fibers embedded in synthetic resin. Until now, the material to be removed, which was about 0.5 mm of the radius, was machined by grinding; by this method of cutting, the time required was about 10 minutes, and it was necessary to make two passes.

By contrast, by turning with a cutting tool according to the present invention, the same work is effected by a single pass and requires only about 2½ minutes. The surface condition of the piece thus machined is comparable to, or even better than, that obtained by grinding.

Of course, the cutting tool according to the invention may be used for other types of machining operations, such as milling, boring, drilling, filleting, etc., particularly of composite materials.

What is claimed is:

1. A cutting tool adapted to be secured to a tool holder, comprising at least one first cutting edge adapted to enter into contact with the piece to be machined and at least one second cutting edge located along at least a portion of its length behind the first cutting edge, these two edges defining between themselves a slot giving access to a channel provided in the tool, said channel extending along the slot and being open at at least one of its ends, the channel having a cross section which is elongated in the direction away from said cutting edges, said cutting edges lying in a plane which extends lengthwise of said cross section of the channel.

2. Cutting tool according to claim 1, in which the cutting angle of each of said edges is between 10° and 50°.

3. Cutting tool according to claim 1, in which the cutting angle of each of said edges is between 15° and 35°.

4. A cutting tool adapted to be secured to a tool holder comprising at least one first cutting edge adapted to enter into contact with the piece to be machined and at least one second edge located along at least a portion of its length behind the first cutting edge, these two edges defining between themselves a slot giving access to a channel in the tool, said channel extending along the slot and being open at at least one of its ends, said tool comprising two superposed bits having an interface between them, each of said bits having one of said edges and defining a portion of the wall of the channel, said edges lying in the same plane as the interface between said bits.

5. Cutting tool according to claim 4, in which the cutting angle of each of said edges is between 10° and 50°.

6. Cutting tool according to claim 4, in which the cutting angle of each of said edges is between 15° and 35°.

7. A cutting tool adapted to be secured to a tool holder, comprising at least one first cutting edge adapted to enter into contact with a piece to be machined and to cut said piece by relative movement of said tool and piece in one direction, and at least one second edge located along at least a portion of its length behind the first cutting edge, these two edges defining between themselves a slot that opens in said one direction, said slot giving access to a channel in the tool, said channel extending along the slot and being open at at least one of its ends.

8. Cutting tool according to claim 7, in which the cutting angle of each of said edges is between 10° and 50°.

9. Cutting tool according to claim 7 in which the cutting angle of each of said edges is between 15° and 35°.

10. Cutting tool as claimed in claim 7, said channel having a cross section which is elongated in the direction away from said cutting edges, said cutting edges lying in a plane which extends lengthwise of said cross section of the channel.

11. Cutting tool as claimed in claim 10, said tool comprises two superposed bits having an interface between them, each of said bits having one of said edges and defining a portion of the wall of the channel, said edges lying in the same plane as the interface between said bits.

* * * * *